(12) United States Patent
Chao et al.

(10) Patent No.: US 7,428,474 B2
(45) Date of Patent: Sep. 23, 2008

(54) INTEGRATED CIRCUIT WITH SELF-PROOFREADING FUNCTION AND MEASURING DEVICE USING THE SAME

(75) Inventors: Po-Yin Chao, Taipei Hsien (TW);
Kuo-Yuan Yuan, Taipei Hsien (TW);
Hsiang-Min Lin, Taipei Hsien (TW)

(73) Assignee: Fortune Semiconductor Corporation, Taipei (TW)

( * ) Notice: Subject to any disclaimer, the term of this patent is extended or adjusted under 35 U.S.C. 154(b) by 125 days.

(21) Appl. No.: 11/465,583

(22) Filed: Aug. 18, 2006

(65) Prior Publication Data

US 2008/0046219 A1 Feb. 21, 2008

(51) Int. Cl.
*G06F 19/00* (2006.01)

(52) U.S. Cl. .................. 702/189; 700/87; 365/189.05; 365/189.12; 365/63; 326/37; 326/38

(58) Field of Classification Search ............... 702/189; 700/87, 18, 86, 121; 365/63, 189.12, 189.04, 365/189.05, 219, 218; 711/121, 102, 103; 710/52, 53, 71; 326/37, 38
See application file for complete search history.

(56) References Cited

U.S. PATENT DOCUMENTS

| | | | | |
|---|---|---|---|---|
| 4,816,823 A | * | 3/1989 | Polkinghorne et al. | 340/3.31 |
| 5,199,032 A | * | 3/1993 | Sparks et al. | 714/703 |
| 5,760,637 A | * | 6/1998 | Wong et al. | 327/536 |
| 6,081,471 A | * | 6/2000 | Palazzi et al. | 365/218 |
| 6,708,135 B2 | * | 3/2004 | Southworth et al. | 702/176 |
| 6,915,175 B2 | * | 7/2005 | Ahn | 700/87 |
| 7,146,442 B2 | * | 12/2006 | Feng et al. | 710/100 |
| 7,167,411 B2 | * | 1/2007 | Ahn | 365/189.05 |

* cited by examiner

*Primary Examiner*—Carol S Tsai

(57) ABSTRACT

An integrated circuit (IC) includes a micro control unit (MCU), a one-time programmable (OTP) memory directly connected with the MCU, an electrical charge pump having an output port and an enable port connected to the MCU, and a switching circuit having a control port connected to the MCU, a first input port connected to the output port of the electrical charge pump, a second input port connected to a power source of the MCU, and an output port connected to the OTP memory to provide an operating voltage and a recording voltage for the OTP memory. Because the OTP memory can choose the operating voltage or the recording voltage, a measuring apparatus using this IC doesn't need an external power source to provide a VDD voltage being 5.8 volts. Therefore, a power consuming of the IC can be reduced.

8 Claims, 3 Drawing Sheets

INTEGRATED CIRCUIT WITH SELF-PROOFREADING FUNCTION AND MEASURING DEVICE USING THE SAME

BACKGROUND OF THE INVENTION

1. Field of the Invention

The present invention relates to an integrated circuit (IC) for measuring and an electrical measuring apparatus using the IC.

2. Description of the Related Art

Currently, a conventional integrated circuit for measuring includes an analog digital converter (ADC), a micro control unit (MCU), a system memory, and so on. Furthermore, the MCU includes a random access memory (RAM), a central processing unit (CPU) and a programmable interface, etc.

When an integrated circuit is utilized in measuring devices, sensors for measuring pressures or weights are receiving measuring signals. The sensors convert the measuring signals to electrical signals, such as voltage signals or current signals. The electrical signals are converted into digital signals by the analog-to-digital converter of the integrated circuit. And then, the digital signals are computed, processed or further converted by the MCU, and are displayed on an external display. The MCU computes, processes or further converts the signals by an instruction set stored in the system memory. The total and order of the instructions construct a program.

However, in the above utilizations, many of the integrated circuits having an analog-to-digital converter must perform a proofreading process before displaying an accurate measuring value. In the proofreading process, a standard measuring object having standard values is used. A sensor communicates with the standard measuring object to send out a standard signal. The standard signal is converted to a digital signal used as a standard value to be stored in the memory. When the MCU performs a normal measuring program, the standard value is taken out to compute an actual measuring value according to a measuring signal. After the proofreading process, a proofreading coefficient is produced correspondingly. The proofreading coefficient must be stored and can be read by the MCU, so that the MCU can accurately perform a computation or a conversion to obtain an accurate value. Therefore, most of electrical elements require an electrically erasable programmable read-only memory (EEPROM) to store the proofreading coefficient.

However, an additional burner is needed to write the proofreading accurately in the EEPROM. After the step of writing, the EEPROM is taken out from the burner and is communicated with an electrical measuring device of a terminal system to finish the proofreading process.

At present, there may be some better methods for recording the proofreading parameters, and it's not necessary to take the EEPROM out of terminal system product as described above. Referring to FIG. 1, a conventional IC 100 is shown. The IC 100 is connected to a display 115, an EEPROM 105 and a sensor 101. Before performing a measuring program, the IC 100 must perform a proofreading procedure. The proofreading procedure includes the following steps: a first step of directly contacting the sensor 101 with a standard object (not shown), a second step of outputting a standard analogical signal to an ADC 103 by the sensor 101, a third step of outputting a standard digital signal to an MCU 109 by the ADC 103 according to the standard analogical signal, and a fourth step of storing standard parameters into an EEPROM 105 through a serial interface circuit 107 after processed by MCU 109. When the MCU 109 performs any instruction, the MCU 109 must access instruction sets from an erasable programmable read-only memory (EPROM) 111.

After finishing the proofreading procedure, the standard parameters are stored into the EEPROM 105. When a normal measuring procedure is performed, the sensor 101 directly contacts with an object to be measured and outputs a measuring signal to the ADC 103. After a step of transforming, the ADC 103 outputs a digital measuring signal to the MCU 109, and the MCU 109 reads the standard parameters form the EEPROM 105 through the serial interface circuit 107. After a step of computing, the MCU 109 outputs a measuring result to the display 115 through a timing-controller 113. The MCU 109 must compute the measuring result according to the standard parameters stored in the EEPROM 105. The MCU 109 must use the serial interface circuit 107 to access the standard parameters. The EEPROM 105 is externally connected to the IC 100.

The above way of storing the standard parameters into an external memory has an advantage that the EEPROM 105 is easily accessed, but it increases a cost of the whole measuring system. In addition, when the proofreading procedure is performed or the program memory is recorded, terminal system products need two extra voltage source VPP=12 volt and VDD=5.8 volt, except for a normal chip power source.

What is needed is to provide an IC with a simple proofreading procedure, a low cost and having a self-proofreading function.

BRIEF SUMMARY

An integrated circuit (IC) with a self-proofreading function includes a micro control unit (MCU), a one-time programmable (OTP) memory directly connected with the MCU, an electrical charge pump having an output port and an enable port connected to the MCU, and a switching circuit having a control port connected to the MCU; a first input port connected to the output port of the electrical charge pump, a second input port connected to a power source of the MCU, and an output port connected to the OTP memory to provide an operating voltage and a recording voltage for the OTP memory.

The IC further includes an analog digital converter (ADC) connected to the MCU, wherein the ADC is used for receiving measuring signals and converting the measuring signals to digital signals. The IC further includes a timing controller connected to the MCU, wherein the MCU outputs a measuring result by the timing controller.

A measuring apparatus with a self-proofreading function includes a sensor, and a measuring circuit. The measuring circuit includes a micro control unit (MCU) for receiving digital signals, an analog digital converter (ADC) connected to the MCU, and a one-time programmable (OTP) memory connecting with the MCU. The ADC is used for receiving measuring signals from the sensor and converting the measuring signals to digital signals. The measuring circuit further includes an electrical charge pump and a switching circuit. The electrical charge pump has an output port and an enable port connected to the MCU. The switching circuit has a control port connected to the MCU; a first input port connected to the output port of the electrical charge pump, a second input port connected to a power source of the MCU, and an output port connected to the OTP memory to provide an operating voltage and a recording voltage for the OTP memory.

The measuring apparatus further includes a timing controller connected to the MCU, wherein the MCU outputs an actual measuring result by the timing controller. The measuring apparatus further includes a display connected to the timing controller and used for displaying the actual measuring result.

As the above description, because the electric charge pump is provide in the IC or the measuring circuit, the OTP memory can have the operating voltage and the recording voltage to be chosen. According a working state of the OTP memory, the OTP memory can select a corresponding voltage. Therefore, the measuring apparatus doesn't need an external power source to provide a VDD voltage being 5.8 volts. And thus, the IC can reduce an external power source when standard parameters are recorded, and a power consuming of the IC can be reduced.

When the IC is applied, because the IC can provide the recording voltage and record standard parameters into the OTP memory without an external memory such as EEPROM, the amount of elements of the measuring apparatus is reduced, and the cost of the measuring apparatus is reduced. The manufacturer of the measuring apparatus doesn't need an external memory to record proofreading parameters before produce the terminal product. And the manufacturer of the measuring apparatus doesn't need to proofread different kinds of parameters according to different kinds of applications beforehand. Therefore, a proofreading procedure is simplified, and costs of the measuring apparatus and the IC can be reduced.

As the above-described, the parameter memory region of the OTP memory can be divided to many sub-divisions, each of which can be used for recording a standard parameter for proofreading at one time. Therefore, the OTP memory of the IC can record proofreading parameters at many times. The IC is more flexibly applied.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe embodiments of the present invention, in detail.

Figure 1:
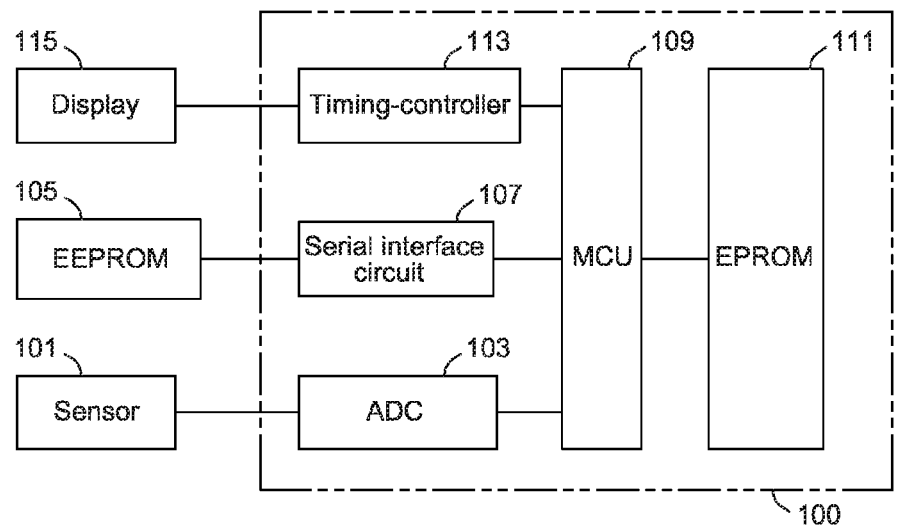
FIG. 1 shows a schematic view of a conventional integrated circuit (IC)
Figure 2:
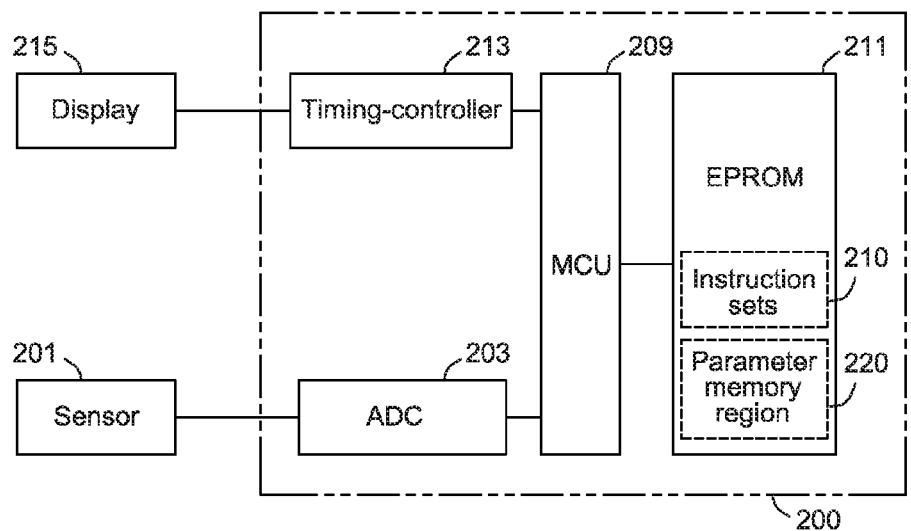
FIG. 2 shows a schematic block diagram of a measuring apparatus in accordance with a first embodiment of the present invention.

FIG. 2 illustrates a schematic block diagram of a measuring apparatus with a one-time programmable (OTP) memory in accordance with a first embodiment of the present invention. The measuring apparatus includes an integrated circuit (IC) 200, a sensor 201 and a display 215. The sensor 201 outputs a measuring signal to the IC 200. The IC 200 outputs a measuring result of an object to be measured to the display 215. In a proofreading procedure, the sensor 201 contacts with a standard object and outputs a standard signal to an analog digital converter (ADC) 203 of the IC 200. The standard signal is analogical signal and is converted to a digital signal by the ADC 203. A micro control unit (MCU) 209 processes the digital signal to get a standard parameter, which can be stored in a parameter memory region 220 of an erasable programmable read-only memory (EPROM) 211.

Figure 3:
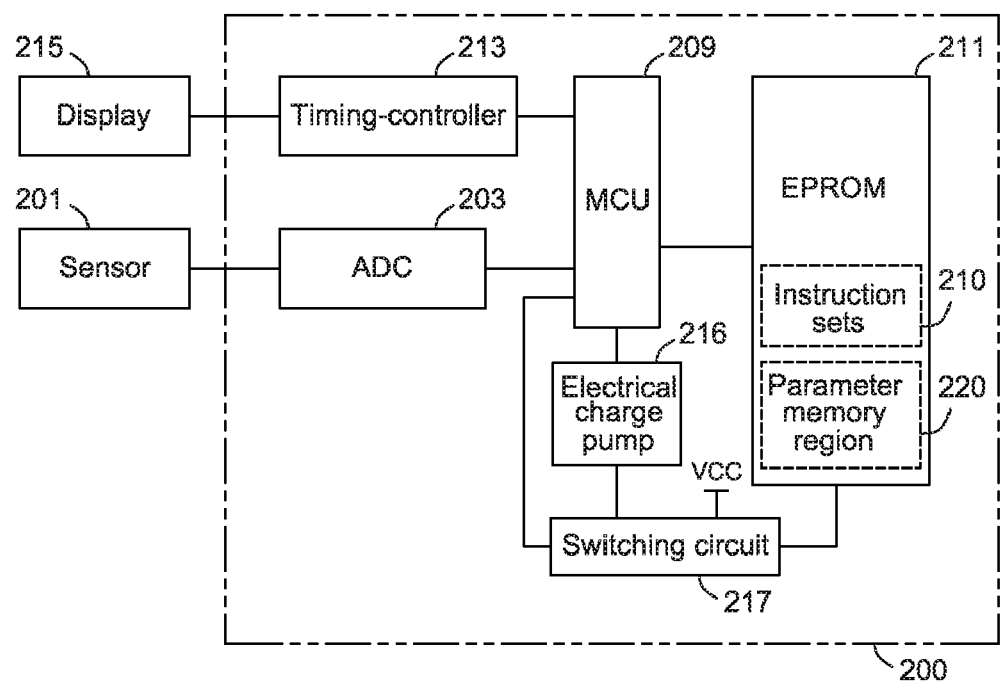
FIG. 3 is a schematic block diagram of a measuring apparatus in accordance with a second embodiment of the present invention.

FIG. 3 is a diagram describing the measuring apparatus in accordance with a second embodiment of the present invention. In this embodiment, the IC 200 uses an electrical charge pump 216 to enhance a voltage of the system power and supply an enhanced voltage for recording standard parameters under a proofreading mode. Under the proofreading mode, when proofreading instructions record standard parameters into the parameter memory region 220 of the OTP memory 211, the MCU 209 outputs an enabling signal to enable the electric charge pump 216, and chooses an output voltage of the electric charge pump 216 by a switching circuit 217. The output voltage is provided to the OTP memory 211. For example, if the power voltage of the IC 200 is 3 volts, after being enhanced, the IC 200 can generate a voltage being 6 volts. Therefore, the terminal system products don't need to connect an external power source with an output voltage being 5.8-volts. That is, the IC 200 can reduce an external power source when standard parameters are recorded, and thus the power consuming of the IC 200 is reduced.

According to embodiments of the present invention, the parameter memory region 220 is a part of the EPROM 211. The MCU 209 can access standard parameters and instructions from the EPROM 211 directly. When the MCU 209 executes a computing function, the MCU 209 can access instructions from the EPROM 211 to perform.

According to embodiments of the present invention, the EPROM 211 can be replaced by an OTP memory. Because data stored in the OTP memory needn't to be deleted, it is feasible to replace the EPROM 211 with the OTP memory.

According to embodiments of the present invention, the sensor 201 can measure some physical parameters, such as a temperature, a voltage, a water pressure, an electrical current, a liquid flow rate, and so on. The sensor 201 outputs an analogical measuring signal after measuring the physical parameters.

When the IC 200 executes a normal measuring procedure, the sensor 201 directly contacts the object to be measured and outputs a measuring signal to the ADC 203. The ADC 203 converts the measuring signal to a digital measuring signal and outputs the digital measuring signal to the MCU 209. The MCU 209 accesses standard parameters from the parameter memory region 220 of the EPROM 211 and computes a measuring result according to the standard parameters. The measuring result is sent to the display 215 to display via a timing controller 213. According to the first embodiment of the invention, the standard parameters for the proofreading procedure are stored in an inside memory region, and thus, the MCU 209 can access the standard parameters from the EPROM without accessing an outside EPROM. The MCU 209 can directly access instruction sets 210 and standard parameters from the EPROM 211 to execute the proofreading procedure and the measuring procedure, and thus, the serial interface circuit can be cut off and the operating speed of the IC 200 is enhanced. On the other hand, the standard parameters are stored in the EPROM 211, and the MCU 209 can access the standard parameters from the EPROM 211. Therefore, the measuring system using the IC 200 does not need an external EEPROM, and a cost of the measuring system can be reduced.

Figure 4:
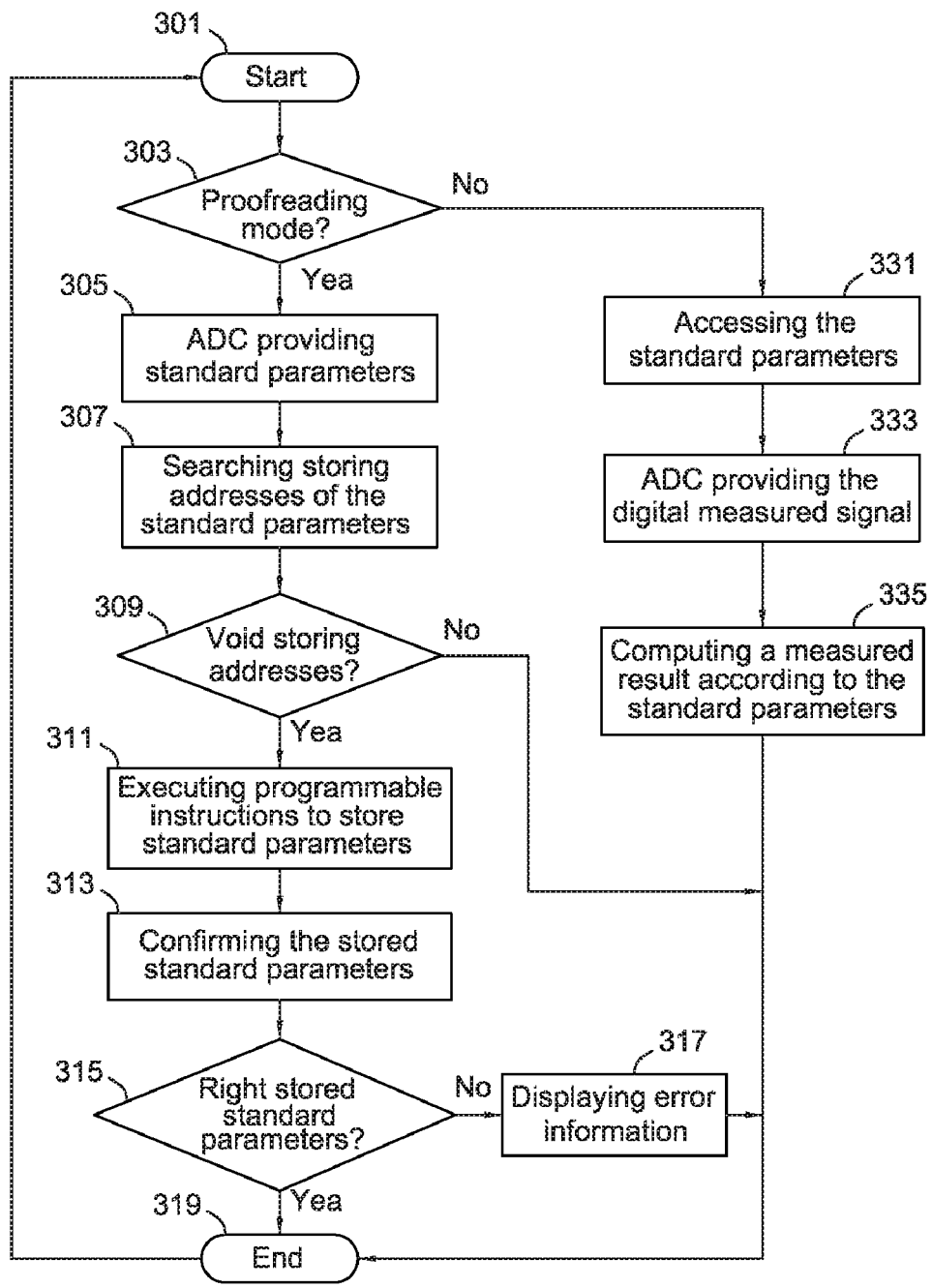
FIG. 4 is a flowchart of a proofreading procedure according to the measuring apparatus of FIG. 3.

FIG. 4 is a flowchart of the proofreading procedure and the measuring procedure according to the IC 200 with the EPROM 211, as shown in FIG. 3. In a step 301, the IC 200 starts to work. In a step 303, whether or not the IC 200 is operating under a proofreading mode is judged. If it is, the proofreading procedure jumps to a step 305; if it is not, the proofreading procedure jumps to a step 331. In the step 305, the ADC 203 provides standard parameters to the MCU 209. In a next step 307, the MCU 209 searches storing addresses of the standard parameters in the EPROM 211. In a next step 309, the MCU 209 judges whether the storing addresses are void, and whether the standard parameters have been stored in the storing addresses. If the storing addresses are void, the proofreading procedure jumps to a step 311. If the standard parameters have been stored in the storing addresses, the proofreading procedure jumps to a step 319, and the self-proofreading procedure is ended. In the step 311, the MCU 209 executes programmable instructions to store the standard parameters in the EPROM 211. After the step 311, the MCU 209 judges whether the stored standard parameters are right in a step 313. In a next step 315, whether the stored standard parameters are right is confirmed. If it is, the proofreading procedure jumps to the step 319, and the self-proofreading procedure is ended. If it is not, the proofreading procedure jumps to the step 317 to display an error information. After that, the proofreading procedure jumps to the step 319, and the self-proofreading procedure is ended.

When judging whether or not the IC 200 is operating under a proofreading mode, if it is not, the step 311 is executed, and the IC 200 begins to execute the measuring mode. In the step 331, the MCU 209 accesses the standard parameters from the EPROM 211. In a next step 333, the MCU 209 receives the digital measuring signal from the ADC 203. After the step 333, the MCU 209 computes a measuring result according to the standard parameters in a step 335. Finally, The step 319 is executed, and the measuring mode is ended.

According to the above embodiments of the present invention, when the IC 200 uses the OTP memory 211, the parameter memory region 220 can be divided into many sub-regions, each of which can be utilized to store standard parameters at one time under a proofreading mode. Therefore, the IC 200 can record many times in the OTP memory.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An integrated circuit (IC) with a self-proofreading function, comprising:
    a micro control unit (MCU);
    a one-time programmable (OTP) memory directly connected with the MCU;
    an electrical charge pump having an output port and an enable port connected to the MCU; and
    a switching circuit having a control port connected to the MCU; a first input port connected to the output port of the electrical charge pump, a second input port connected to a power source of the MCU, and an output port connected to the OTP memory to provide an operating voltage and a recording voltage for the OTP memory
    wherein the OTP memory comprises in instruction memory region for storing instructions, and a parameter memory region for storing standard parameters for proofreading, and
    wherein the instructions stored in the OTP memory has proofreading instructions and measuring instructions for enabling the IC operate under a proofreading mode and a measuring mode, respectively.

2. The IC of claim 1, further comprising an analog digital converter (ADC) connected to the MCU, wherein the ADC is used for receiving measuring signals and converting the measuring signals to digital signals.

3. The IC of claim 1, further comprising a timing controller connected to the MCU, wherein the MCU outputs an actual measuring result by the timing controller.

4. The IC of claim 1, the MCU accesses standard parameters and instructions from the OTP memory.

5. A measuring apparatus with a self-proofreading function, comprising a sensor; and a measuring circuit, the measuring circuit comprising:
    a micro control unit (MCU) for receiving digital signals;
    an analog digital converter (ADC) connected to the MCU, the ADC being used for receiving measuring signals from the sensor and converting the measuring signals to digital signals;
    a one-time programmable (OTP) memory directly connected with the MCU;
    an electrical charge pump having an output port and an enable port connected to the MCU; and
    a switching circuit having a control port connected to the MCU, a first input port connected to the output port of the electrical charge pump, a second input port connected to a power source of the MCU, and an output port connected to the OTP memory to provide an operating voltage and a recording voltage for the OTP memory
    wherein the OTP memory comprises en instruction memory region for storing instructions, and a parameter memory region for storing standard parameters for proofreading, and
    wherein the instructions stored in the OTP memory has proofreading instructions and measuring instructions for enabling the IC operate under a proofreading mode and a measuring mode, respectively.

6. The measuring apparatus of the claim 5, further comprising a timing controller connected to the MCU, wherein the MCU outputs an actual measuring result by the timing controller.

7. The measuring apparatus of the claim 6, further comprising a display connected to the timing controller and used for displaying the actual measuring result.

8. The measuring apparatus of claim 5, the MCU accesses standard parameters and instructions from the OTP memory.

* * * * *